(No Model.)  2 Sheets—Sheet 1.
A. CÔTÉ.
DETACHABLE PIPE COUPLING.
No. 422,296. Patented Feb. 25, 1890.
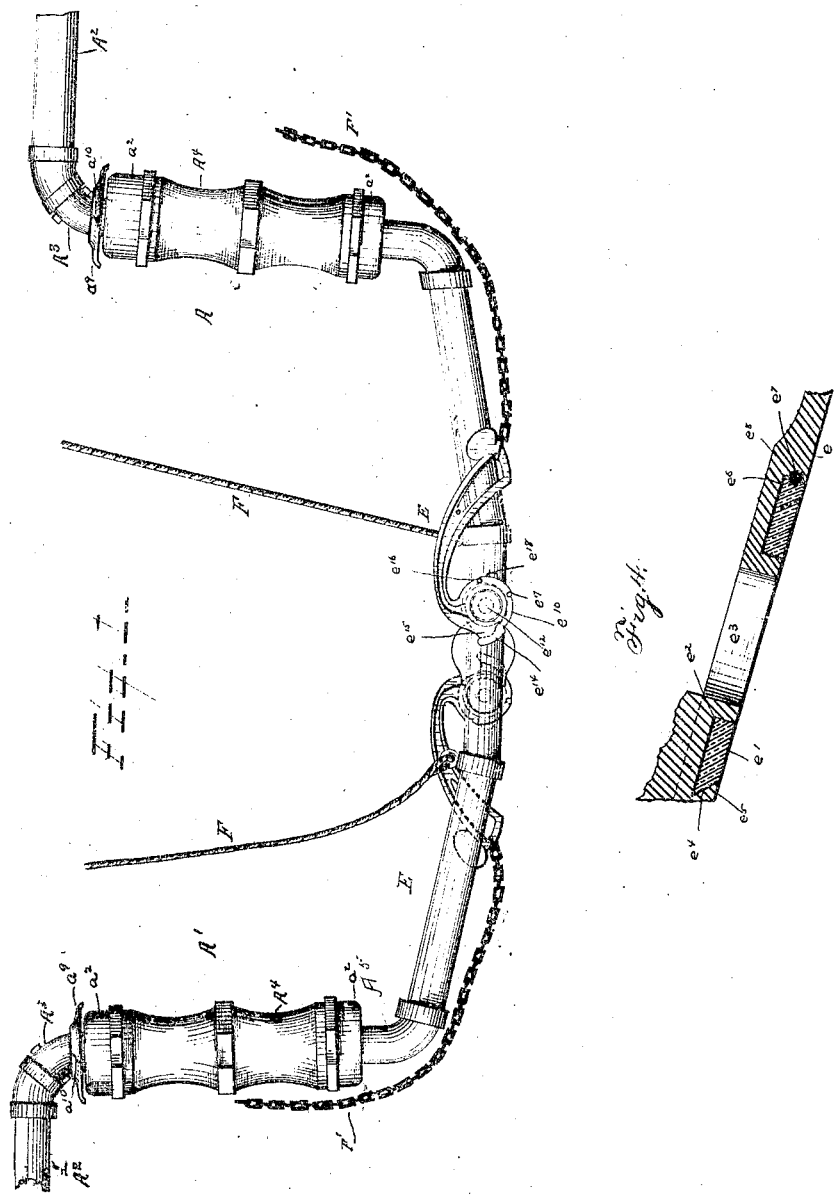
WITNESSES
INVENTOR
Alphonse Coté
per Hallock and Hallock
Attorneys

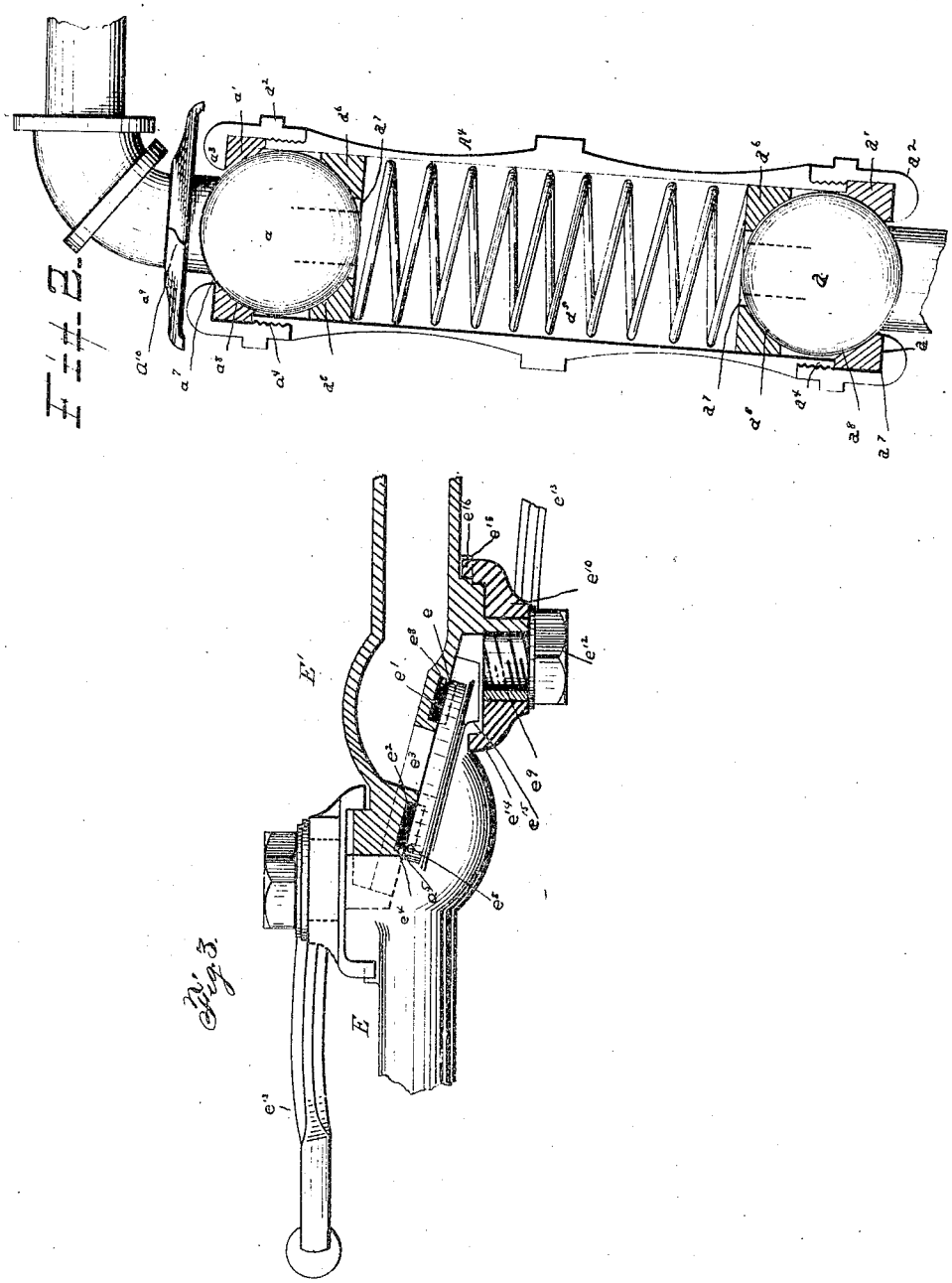

UNITED STATES PATENT OFFICE.

ALPHONSE COTÉ, OF NEW YORK, N. Y.

DETACHABLE PIPE-COUPLING.

SPECIFICATION forming part of Letters Patent No. 422,296, dated February 25, 1890.

Application filed March 21, 1889. Serial No. 304,187. (No model.)

*To all whom it may concern:*

Be it known that I, ALPHONSE COTÉ, a citizen of the United States, residing at New York, in the county of New York and State of New York, have invented certain new and useful Improvements in Detachable Pipe-Couplings; and I do hereby declare the following to be a full, clear, and exact description of the invention, such as will enable others skilled in the art to which it appertains to make and use the same.

My invention relates, generally, to that class of couplings which are used upon cars for conveying steam, hot air, and other heating media from car to car, and particularly to the means for coupling the sections and to means for allowing sufficient swing to prevent the sections from breaking or becoming uncoupled.

The object and nature of the invention will more fully appear from the subjoined description, and the novelty will be fully pointed out in the claims, reference being had to the accompanying drawings, in which—

Figure 1 represents an elevation of my device; Fig. 2, a section, on an enlarged scale, of one of the cylinders and its adjoining parts; Fig. 3, a view showing one of the couplings in section and the other in elevation or bottom plan; and Fig. 4, a detail showing the manner of securing the packing in place, on a larger scale than that shown in Fig. 3.

A A' represent the pipes extending from the cars. As each one is similar in construction, I shall only describe one of them. Pipe $A^2$ is a portion of the pipe extending outside of the car. To the outer end is secured a curved pipe $A^3$, carrying a ball $a$ on its outer end. Before securing the pipe $A^3$ to pipe $A^2$ the annular packing $a'$ and nut $a^2$ are slipped over that end of the pipe which is secured to pipe $A^2$. The packing and nut each have an opening of sufficient diameter to permit of the ball being turned in its socket when that motion is necessary, and the nut is provided with an annular flange $a^3$ for covering the packing. The ball end of the pipe is then inserted in a cylinder $A^4$, and the packing $a'$ laid upon the end $a^4$ of the cylinder, and the nut $a^2$ screwed down upon the screw-threaded end of cylinder $A^4$. The lower end of the cylinder is provided with a curved pipe $A^5$ of substantially the same shape as pipe $A^3$ and provided with a ball $a$ at its end. It is secured in place by the same means as those shown at the upper end of the cylinder. To the free end of pipe $A^5$ is secured a second pipe carrying one part of the coupling E.

In practice it has been found that the pressure of steam in cylinder $A^4$ is sufficient to hold the balls against their seat on packing $a'$. I find, however, that it is desirable in some cases to have the balls held in contact with their seats. This is particularly so when no steam is passing through the coupling, as the balls may then separate from their seats to a greater or less extent. To overcome this, a coiled spring $a^5$ is inserted in the cylinder in such manner as to have its ends pressing against the balls $a$. If desired, a second packing $a^6$ may be inserted between the ends of the spring and the balls. A metal ring may be secured to the side of the packing to prevent the metal spring from wearing its face.
These packings fit the bore of the cylinder, and are provided with the central aperture $a^7$ and the rounded seat $a^8$, like packings $a'$. These packings $a^6$ prevent steam and also dirt from passing between the balls $a$ and the cylinder. The dirt, if allowed to get between the parts just referred to, would soon wear away the surfaces of the cylinder and ball and also the packing $a'$. To prevent the dirt from getting between the packing $a'$ and the ball $a$ at the upper end of the cylinder, I provide a shield $a^9$, which may be slipped over the end of pipe $A^3$. My preferred shield, however, is made of lead, which is split at $a^{10}$, so that it can be slipped around the pipe and the edges of the slit brought together. By such a construction the shield can be made to clasp the pipe tight, and thus prevent it from slipping or any dirt from passing between it and the pipe.

The coupling or device for securing the ends of the pipe together consists of two parts E, formed alike and fitting into each other in such manner as to form a tight and close joint. The abutting faces $e$ of the joint are provided with a packing $e'$, inserted into a recess $e^2$ around the steam-opening $e^3$. The packing has one part $e^4$ beveled and inserted beneath the lip $e^5$ of the abutting face $e$. On the edge of the packing opposite to the beveled edge a groove $e^6$ is formed. This groove $e^6$ registers with a groove $e^7$ in the wall of the recess $e^2$, and together they form a passage for a pin $e^8$, which is inserted vertically through the casting, and in combination with the beveled part $e^4$ and lip $e^5$ holds said packing securely in place. The outer side of each part $E'$ $E^2$ is provided with a hollow projection $e^9$, screw-threaded upon the inside and smooth upon the outside to receive the locking sleeve $e^{10}$, which is held in place by the bolt $e^{12}$, screwed into the projection $e^9$. The sleeve is oscillated on projection $e^9$ by a handle $e^{13}$, which is used to lock and unlock the sleeve $e^{10}$ from the part $E^2$. The locking-cam $e^{14}$ on sleeve $e^{10}$, when the parts are locked together, embraces a cam-face $e^{15}$ on the part $E^2$, and is held there by frictional contact. The sleeve is also provided with stops $e^{16}$ and $e^{17}$, which limit the oscillating movement of the handles by contacting with a boss $e^{18}$ on the part $E'$ and $E^2$.

If desired, the coupling may be supported from the cars by cable or chains $F$, and the locking-handles may also be connected with the cars by chains $F'$, which will unlock the coupling if the cars become detached from each other.

This coupling, by reason of the balls and cylinder, will have a free movement that will prevent the coupling from becoming unlocked or broken from the butting and pulling of the cars, and all leakage at the joint is prevented by reason of the steam acting upon the balls to hold them against the packing. The best result is produced by making the area of the cylinder about five times the area of the steam-openings in the balls.

I am aware that a series of castings having a ball at one end and an enlargement at the other end to receive the ball of the adjoining casting, which ball is held in place by a cap and has interposed between it and the inner shoulder of the enlargement a spring which holds the ball in place and permits of longitudinal movement of the casting, is old, and to that I make no claim. My device differs from that form of coupling, in that the cylinder is an ordinary piece of pipe and requires no special casting to make, and in that the cylinder is connected at each end with the curved pipes bearing the balls and upon which the cylinder is moved whenever the action of the cars to which the coupling is attached makes such movements necessary, whereas in the former device the sections are first moved into the enlarged bore and then turned on their bearing.

What I claim as new is—

1. In a pipe-coupling, the combination of an upper curved pipe having a ball at one end, a lower curved pipe having a ball at its upper end, and a cylinder secured to the upper and lower balls and having a packing interposed between the balls and the securing device on the ends of the cylinders.

2. In a pipe-coupling, the combination of an upper curved pipe having a ball at one end, a lower curved pipe having a ball at its upper end, a cylinder secured to the upper and lower balls and having a packing interposed between the balls and the securing device on the ends of the cylinders, and the coiled spring in the cylinder and pressing against said balls.

3. In a pipe-coupling, the combination of a cylinder having a packing at each end, two pipes, one at each end of the cylinder and each provided with a ball having its bearings upon said packing, a coiled spring within said cylinder, and packing interposed between the balls and springs, substantially as described.

4. The combination of a cylinder having screw-threaded ends and upper and lower curved pipe, each having a ball at one end, a cap or screw-nut at each end of the cylinder to hold the balls in place, and packing having an opening for the pipes and interposed between the cylinder and the screw-nut or cap.

5. In a pipe-coupling, the combination of the abutting faces having a recess, one part of which is provided with a lip and another part with a groove, the packing having a beveled portion and a groove, and a pin for locking the packing in place.

6. In a pipe-coupling, the combination of the parts $E'$ $E^2$, having the hollow projection and cam-face, the sleeve journaled on said projection, and the bolt screwed into the projection and securing the sleeve in place.

7. The combination of the parts $E'$ $E^2$, having the hollow projection and cam-face and boss, the sleeve journaled upon the projection and having the cam and stops, and the screw-bolt inserted in said projection and holding the sleeve in place.

8. The combination of the pipe, the cylinder loosely jointed to said pipe, and a shield split at $a^{10}$ above the joint between the cylinder and pipe to protect said joint from dust.

In testimony whereof I affix my signature in presence of two witnesses.

ALPHONSE COTÉ.

Witnesses:
ROBERT CARTER,
M. F. HALLECK.